United States Patent
van den Broek

(10) Patent No.: US 6,581,359 B1
(45) Date of Patent: Jun. 24, 2003

(54) PROCESS AND POLYMER FILMS FOR FRESH MEAT PACKAGING

(76) Inventor: Adrianus Theodorus Josephus van den Broek, Klein Ravels 19, 2380 Ravels (BE)

( * ) Notice: Subject to any disclaimer, the term of this patent is extended or adjusted under 35 U.S.C. 154(b) by 120 days.

(21) Appl. No.: 09/712,039

(22) Filed: Nov. 13, 2000

(51) Int. Cl.$^7$ ................................ B65B 55/14
(52) U.S. Cl. .................... 53/434; 53/440; 53/442; 426/127; 426/129; 426/412
(58) Field of Search .................. 53/434, 440, 442; 426/127, 129, 412

(56) References Cited

U.S. PATENT DOCUMENTS

| | | |
|---|---|---|
| 3,264,272 A | 8/1966 | Rees |
| 3,355,319 A | 11/1967 | Rees |
| 4,351,931 A | 9/1982 | Armitage |
| 4,606,922 A | 8/1986 | Schirmer |
| 4,820,536 A | 4/1989 | Lippincott et al. |
| 5,028,674 A | 7/1991 | Hatch et al. |
| 5,139,805 A * | 8/1992 | Tada et al. .................. 426/412 |

OTHER PUBLICATIONS

Dupont: "Meat/chees/fish packaging"; Publication H–56747; Sep. 1994.

* cited by examiner

*Primary Examiner*—D. S. Nakarani
(74) *Attorney, Agent, or Firm*—Browdy and Neimark, P.L.L.C.

(57) ABSTRACT

This invention consist of the application of ionomers with high acid comonomer content and neutralisea with specific metal ions as sealant layers for multilayer for fresh meat packaging with improved meat juice or purge retention and a process to archieve this. It has been found that for this application a copolymer of ethylene and an $\alpha,\beta$-unsaturated $C_3$–$C_8$ carboxylic acid, preferably 1–30% by weight, preferably acrylic acid or methacrylic acid, that is partly neutralized with at least one metal ion is most suitable. The copolymer may further contain an acrylate, and may be processed by e.g. extruding or casting a sheet or blowing a film.

16 Claims, No Drawings

PROCESS AND POLYMER FILMS FOR FRESH MEAT PACKAGING

BACKGROUND OF THE INVENTION

The present invention relates to ethylene copolymer compositions that are useful for fabricating films for the packaging of red fresh meat and to a process for packaging red fresh meat.

More particularly, the ethylene copolymer compositions of the present invention are based on a copolymer of ethylene with carboxylic acid and partially neutralised with ions and thus are able to react with the surface of the red fresh meat under specific processing conditions and prevent blood or water contained in the meat to accumulate between meat and packaging film.

Ethylene copolymer compositions used in the present invention are well known in the packaging industry for the packaging of cooked and fresh meat (Dupont Publication H56747 1/96). Examples of such uses are as sealants or shrink film in mono- or multilayer films for food packaging or even, more specifically, as a sealant for secondary sealing to prevent meat juice from sweeping in between the two film layers, thus avoiding micro channel leakers. They are known for their alledged superior adhesion to cooked meat and are used in cooked ham and cooked Turkey packaging.

However, this process and packaging films do not fully prevent the meat juice of leaving the meat once the package is opened or damaged due to insufficient adhesion to the fresh meat.

The ethylene copolymer composition and the process of the present invention overcomes the aforementioned problems, and yields packages that effectively increase the retention of meat juice within packaged fresh meat.

SUMMARY OF THE INVENTION

The present invention provides a flexible packaging film with a sealant layer made up of a polymer composition comprising a copolymer of ethylene and between 12 and 30, preferably between 15 and 20 wt % of α,β-unsaturated $C_3$–$C_8$ carboxylic acid, which acid is partially neutralised from 10–99.5%, preferably between 15 and 70% with at least one ion, preferably chosen from Zn, Mg and Ca, whereof Zn is he most preferred. The copolymer may further contain an acrylate.

The present invention provides a package that uses this film for the packaging of red fresh meat which is heated with the red fresh meat for seconds above the Vicat temperature, closes the cells of the red meat without changing its color and thus reduces the loss of meat juice or blood of the meat significantly compared to other sealant materials.

DETAILED DESCRIPTION OF THE INVENTION

This invention consist of the use of ionomers with high acid comonomer content and neutralised with specific metal ions as sealant layers for multilayer films for fresh meat packaging with improved meat juice or purge retention and a process to archieve this. It has been found that for this use a copolymer of ethylene and an α,β-unsaturated $C_3$–$C_8$ carboxylic acid, preferably in an amount of 1–30% by weight, preferably acrylic acid or methacrylic acid, which carboxylic acid is partly neutralized with at least one metal ion, is most suitable. The copolymer may further contain an acrylate, and may be processed by e.g. extruding or casting a sheet or blowing a film.

The ionomer is described below:

Acid Copolymer and Ionomer

The acid copolymers an ionomers of the present invention are derived from direct copolymers of ethylene and α,β-ethylenically-unsaturated $C_3$–$C_8$ carboxylic acid ("ethylene-acid copolymers") by neutralization with metal ions.

By "direct copolymer", it is meant that the copolymer is made by polymerization of monomers together at the same time, as distinct from a "graft copolymer" where a monomer is attached or polymerized onto an existing polymer chain. Methods of preparing such ionomers are well known and are described in U.S. Pat. No. 3,264,272 which is herein incorporated by reference. Preparation of the direct ethylene-acid copolymers on which the ionomers are based is described in U.S. Pat. No. 4.351,931 which is also incorporated by reference herein.

The ethylene-acid copolymers used to make the ionomeric copolymer of this invention can be E/X/Y copolymers where E is ethylene; X is a softening comonomer and Y is the α,β-ethylenically-unsaturated $C_3$–$C_8$ carboxylic acid, particularly acrylic or methacrylic acid. Preferably, however, the ethylene-acid copolymer is a dipolymer (no softening comonomer). The preferred acid moieties are methacrylic acid and acrylic acid.

By "softening", it is meant that the polymer is made less crystalline. Suitable "softening" comonomers (X) are monomers selected from alkyl acrylate, and alkyl methacrylate, wherein the alkyl groups have from 1–12 carbon atoms which, when present, may be up to 30 (preferably up to 15, most preferably up to 5) wt % of the ethylene-acid copolymer.

A wide range of percent acid moiety in the ethylene-acid copolymer may be used. The acid moiety may be present in a range of about 1 to 30 weight percent of the acid copolymer, preferably in a range of about 12 to 25, alternatively about 15 to about 20. The ethylene-acid copolymers with high levels of acid are difficult to prepare in continuous polymerizers because of monomer-polymer phase separation. This difficulty can be avoided however by use of "cosolvent technology" as described in U.S. Pat. No. 5.028.674 which is also incorporated herein by reference or by employing somewhat higher pressures than those at which copolymers with lower acid can be prepared.

The copolymer can be from about 10 to 99.5% neutralized with metal ions selected from groups Ia, Ib, IIa, IIIa, IVa, VIb and VIII of the Periodic Table of Elements such as sodium, potassium, zinc, calcium, magnesium, lithium, aluminum, nickel and chrominum. Preferred for best meat adhesion are ions such as zinc, calcium or magnesium selected from groups IIa and IVa of the periodic table, most preferred is zinc. Such neutralized ethylene acid copolymers are known in the art as "ionomers". Typically, neutralization will be from 10–70%. Preferably the copolymer has from about 35 to 70% of the carboxylic acid groups ionized by neutralization with metal ions.

Preferred ethylene-acid dipolymers are ethylene/acrylic acid and ethylene/methacrylic acid. Specific other copolymers include ethylene/n-butyl acrylate/acrylic acid, ethylene/n-butyl acrylate/methacrylic acid, ethylene/iso-butyl, acrylate/methacrylic acid, ethylene/iso-butyl acrylate/acrylic acid, ethylene/n-butyl methacrylate/methacrylic acid, ethylene/methyl methacrylate/acrylic acid.

Suitable ionomers for use in the present invention are commercially available under the trademark Surlyn®, suitable ethylene acid copolymers are available under the trademark Nucrel®, both from the DuPont Company.

Films

For the present invention the aforementioned polymer is used as the sealant layer in a multilayer structure with at least 3 layers of the type X/tie/sealant, whereas X can represent one or more structural and barrier layers with and corresponding tie layers.

The sealant layer will be in contact with the red fresh meat. The structure can be made by the blown film or the cast sheet process or by laminating films together.

Processing

During the packaging process, after the sealing of the package is complete, the entire package is heated at temperatures between the Vicat temperature and the melting temperature of the sealant material. This process is called "secondary sealing" and is well known in the industry. In the case of the aforementioned ionomers this will be between 50–85° C.

The heating time has to be limited between 0.5–5 seconds.

The secondary sealing operation will provide an intense film-to-film contact there where no meat is in between the 2 films and provide additional protection against leakers and vacuum. This is particularly important if the package is damaged during distribution. In addition secondary sealed packs with ionomers described in this invention prevent migration of the meat juices within the package, minimising bacteria growth and leading to a more esthetical package.

However, upon opening of the package and releasing the vacuum the meat juice and blood is allowed to leave the red fresh meat, which results in a weight loss of the final meat.

Ionomers commonly used in this application have low acid content (between 9 and 12% by weight and are neutralized with Na and Zn.

It has been found surprisingly that by using ionomers wish elevated acid and Zn ion content and applying secondary seal temperatures above the Vicat temperature of these ionomers but below the melting temperature ionomers for short time will have the following effects:

- The pores of the meat will be closed and the meat juice retained
- The purge upon opening the package is reduced by 30–100%
- Nearly no meat juice is present between meat and interior of the packaging film This effect cannot be observed by the ionomers currently used for packaging meat as the acid content of these ionomers is too low to give sufficient meat adhesion and as the melting point of these ionomer is too high to obtain a good reaction with the meat that leads to closing of the pores but at the same time is low enough to prevent a colour change of the meat during the secondary heat treatment.

The invention is further explained in the following examples.

EXAMPLES

The following materials were used:
PA6: Ultramid B35
Surlyn 1857, tie layer for Surlyn to PA adhesion
LDPE: Stamylan from DSM
EVA Elax from Dupont, having a MFI of 0,5–5 and containing 18% VA
Ionomer 1, Na based, with 10% by weight methacrylic acid content and having a MFI of 1 at 190° C.
Ionomer 2, Surlyn 1705, Zn based, 15% by weight methacrylic acid content and having a MFI of 5 at 190° C.
Ionomer 3, Surlyn 9120, Zn based, 19% by weight methacrylic acid content and having a MFI of 1 at 190° C.

The aforementioned materials were fed to a 50 mm Reifenhauser extruder. This extruder was part of 3 layers Reifenhauser blown film line equipped with a Barmag 3 layer die, where the following 3 layer structure was prepared:
PA6/Tie/Sealant

| | | |
|---|---|---|
| PA6 | fed to extruder 1 | 30 microns |
| Tie | fed to extruder 2 | 10 microns |
| Sealant | fed to extruder 3 | 50 microns |

The temperature profile that was extablished, was as follows:

| | 1 | 2 | 3 | 4 | 5 | Die |
|---|---|---|---|---|---|---|
| Extruder 1 | 220 | 220 | 230 | 240 | 240 | 240 |
| Extruder 2 | 170 | 180 | 190 | 200 | 210 | 220 |
| Extruder 3 | 180 | 190 | 200 | 210 | 220 | 230 |

Fresh red meat types, like beef, porc, veal, was packaged on a commercial meat packaging equipment (Multivac Type of Vacuum chamber), using one film as the upper and an other identical film as the lower web.

Other type of meats or even other types of cuts may lead to a somewhat different result of meat juice retention.

The meat was packaged in a pouch and by a primary sealing operation which seales the upper web to the lower web at following conditions: seal pressure 1–6 Atm, 0.3–5 sec. time, temp. 80–100° C. This was followed by a second sealing operation where the surface areas between upper and lower web which are direct in contact with each other are sealed without application of pressure.

Second seal may also be imparatively included or combined with first sealing operation.

This was done by reheating the vacuum packaged piece of red, fresh meat at 50–85° C. for 0.8 seconds, short enough to prevent discoloration of the red meat but long enough to seal the 2 areas together as well as to close the meat pores through contact with the low melting Surlyn® sealant types.

This reheating is done by using water of 50–85° C., hot air, infra red, steam injection or any other source of energy.

Hot air temperatures are higher because of less intensif heat conduction.

The following results were determined thereafter:

Melt Temperature of the sealant was measured with DSC according to ASTM D 1238.

Purge retention was measured by storing the packed pieces of meat for 4 weeks at 0–40° C. in a cooling house. Then the packages were opened and the liquid was separated from the meat. Thereafter the meat and the liquid were weighed separately. The purge is defined as the percentage of weight of the liquid that was separated:

$$\text{Purge \%} = \frac{\text{Total weight} - \text{weight of meat}}{\text{Total Weight}} \times 100$$

| Examples | Sealant | Pouches/thermo-formed moulds | | | |
|---|---|---|---|---|---|
| | | Vicat Temp (°C.) | Melt Temp (°C.) | Meat Adhesion | Purge Retention |
| EX 1 | LPE | 100 | 120 | no | no |
| Ex 2 | EVA | 60 | 80 | no | no |
| Ex 3 | Ionomer 1 | 85 | 94 | no | no |
| EX 4 | Ionomer 2 | 65 | 85 | yes | yes |
| EX 5 | Ionomer 3 | 60 | 88 | yes | yes |

It was surprisingly found that using specific ionomer types with high acid numbers and therefore lower melting and Vicat temperatures allows for sufficient temperature in order for an interaction between red meat and Surlyn® sealant which closes the pores of the meat and reduces significantly liquid loss. By red meat, types like beef, porc, veal, juice, blood or purge that leaves the meat after cutting is reduced. This cannot be achieved by nonreactive sealants with similar melting temperatures and even not by ionomers which are currently used for this purpose due to their higher melting temperature.

This is observed during the preparation of so called pouches, where the meat is simply vacuum packed in films as well as during the packing of meat in already thermoformed cavities or moulds.

Such sealant materials can therefore be used as sealing materials in, optionally thermoformable, shrink films which can optionally be also oriented or bi-oriented, together with at least one other structural or barrier layer and tie layer. Examples include structures such as PA/tie/sealant, LDPE/tie/EVOH/tie/sealant, sealant/tie/EVOH/tie/sealant or PA/tie/EVOH/tie/sealant. EVOH is ethylenecovinylalcohol, a common oxygen barrier layer used in meatpackaglng instead of the more commonly used polyamide.

What is claimed is:

1. A process for packaging fresh meat in a flexible packaging film, comprising;

providing, as said flexible packaging film, a plural-layer film having at inner layer of an acid copolymer or ionomer sealant layer comprising a copolymer of ethylene and from 15–30wt % alpha-beta unsaturated $C_3$–$C_8$ carboxylic acid, wherein acid groups thereof are optionally neutralized from 10–99.5% with at least one metal ion;

vacuum packaging and heat sealing fresh meat in said flexible packaging film with said fresh meat adjacent said sealant layer to provide a packaged and sealed fresh meat; and heating said packaged and sealed fresh meat for 0.5–5 seconds at a temperature of 50–85° C. to develop and maintain adhesion between the fresh meat and said sealant layer.

2. The process of claim 1, wherein said acid groups are neutralized from 10–99.5% with at least one metal ion.

3. The process according to claim 2, wherein the metal ions are selected from the group consisting of Na, K, Li, Mg, Ca and Zn.

4. The process of claim 3, wherein said metal ions are ions of Zn.

5. The process of claim 1, wherein the acid groups are neutralized in an amount of from 10–70% with at least ore metal ion.

6. The process according to claim 5, wherein the metal ions are selected from the group consisting of Na, K, Li, Mg, Ca and Zn.

7. The process of claim 1, wherein the acid groups are neutralized in an amount of from 35–70% with at least one metal ion.

8. The process according to claim 7, wherein the metal ions are selected from the group consisting of Ma, K, Li, Mg, Ca and Zn.

9. The process according to claim 1, wherein the secondary sealing operation is performed by applying a temperature between the Vicat temperature and the melting temperature of the ionomer sealant layer.

10. The process according to claim 1, wherein the heat sealing operation is performed at a temperature of 80–100° C. for 0.8 seconds.

11. The process according to claim 1, wherein the ionomer contains from 15–25 wt % of α,β-unsaturated $C_3$–$C_8$ carboxylic acid.

12. The process according to claim 1, wherein the ionomer contains from 15–20 wt % of α,β-unsaturated $C_3$–$C_8$ carboxylic acid.

13. The process of claim 1, wherein said flexible packaging film is in the form of a bag.

14. The process of claim 13, wherein said bag is a thermoformed bag, a shrinkable bag, a sausage casing or a fresh meat bag.

15. The process of claim 1, wherein said sealant layer copolymer further comprises a $C_1$–$C_{12}$ alkyl acrylate or $C_1$–$C_{12}$ alkyl methacrylate.

16. A process for packaging fresh meat in a flexible packaging film, comprising:

providing, as said flexible packaging film, a plural-layer film having an inner layer of an acid copolymer or ionomer sealant layer comprising a copolymer of ethylene and from 15–30% alpha-beta unsaturated $C_3$–$C_8$ carboxylic acid, said acid groups being neutralized from 10–99.5% with at least one metal ion;

vacuum packaging and sealing fresh meat in said flexible packaging film with said fresh meat adjacent said sealant layer to provide a packaged and sealed fresh meat;

heating said packaged and sealed fresh meat for 0.5–5 seconds at a temperature of 50–85° C. to develop and maintain adhesion between the fresh meat and said sealant layer; and storing said packaged and sealed fresh meat at 0–4° C., whereby purge retention of said fresh meat is achieved.

* * * * *